April 8, 1941.   W. W. FRYMOYER   2,237,598
CONDITION INDICATING INSTRUMENT
Filed Oct. 5, 1938
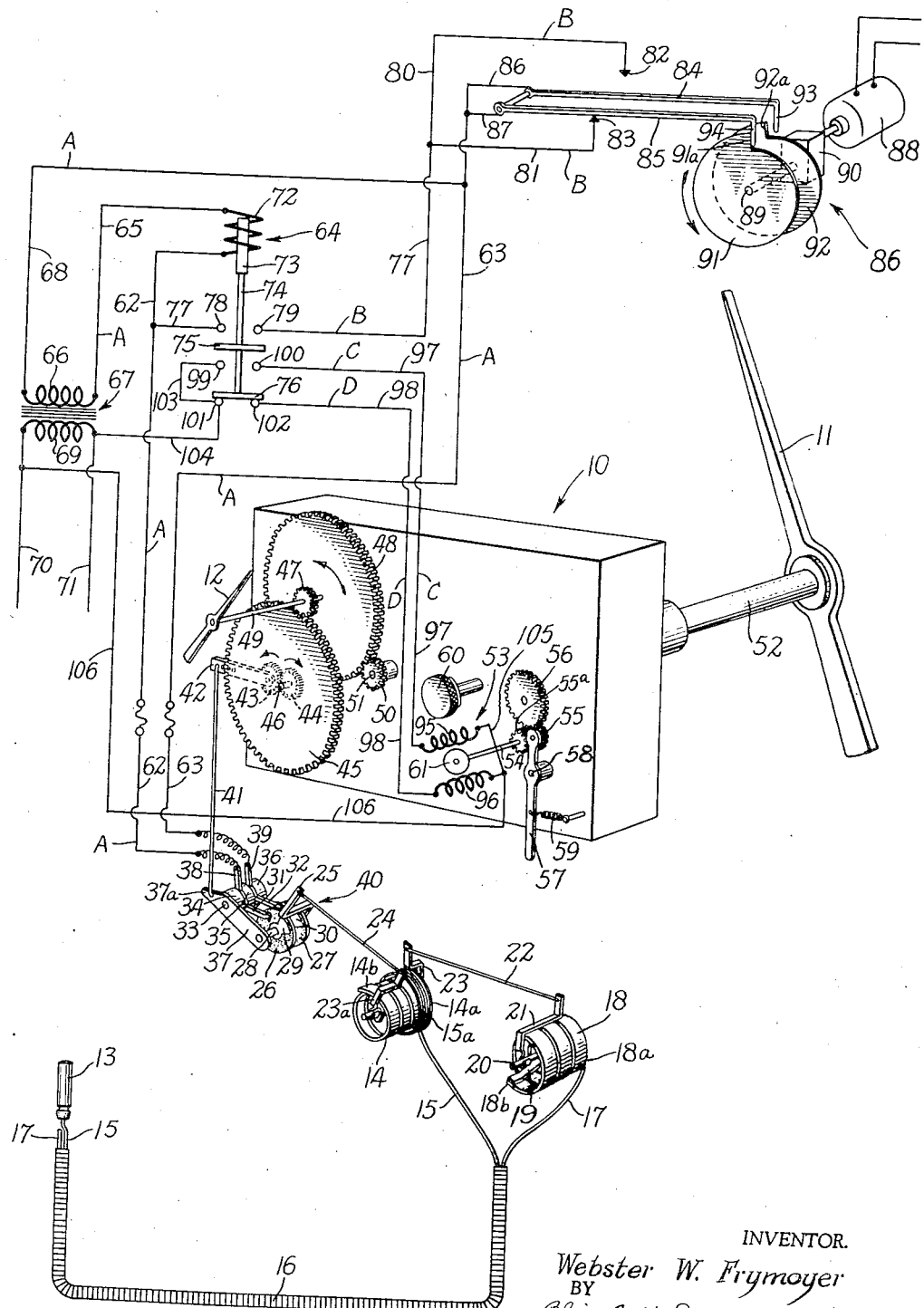
INVENTOR.
Webster W. Frymoyer
BY
Blair, Curtis, Dunne & Hayward
ATTORNEYS Patented Apr. 8, 1941

2,237,598

UNITED STATES PATENT OFFICE 2,237,598

CONDITION INDICATING INSTRUMENT

Webster W. Frymoyer, Foxboro, Mass., assignor to The Foxboro Company, Foxboro, Mass., a corporation of Massachusetts Application October 5, 1938, Serial No. 233,350

3 Claims. (Cl. 73—339)

This invention relates to a condition responsive apparatus and more particularly to an instrument for indicating outside, as on a highway or building, a temperature or other condition existing either at the instrument or at some point removed.

It is among the objects of this invention to provide an outdoor temperature indicating device which is characterized by simplicity, sturdiness and dependability. A further object is to provide a device of the above nature which can cope with varied weather conditions and accurately indicate wide fluctuations in atmospheric conditions over extended periods of time without the necessity of attention. Other objects will be in part apparent and in part pointed out hereinafter.

The invention accordingly consists in the features of construction, combinations of elements, and arrangements of parts as will be exemplified in the structure to be hereinafter described and the scope of the application of which will be indicated in the following claims.

In the drawing wherein there is shown one of the various possible embodiments of this invention, The figure is a diagrammatic perspective view of a temperature indicating instrument which embodies the invention.

To preface the description of the invention and thereby clarify certain aspects thereof, it might be noted that large outdoor indicating instruments such as thermometers, for example, are generally inaccurate in their indications and undependable in so far as extended and unattended operation is concerned. Instruments of this type are often located in isolated or inaccessible spots where they are subjected to all sorts of weather conditions and temperature variations. In many of these instruments inaccuracies inevitably result through expansion or contraction of operating parts from temperature changes. Others cannot operate continuously unattended. Still others, particularly when greatly enlarged so as to be visible from a distance, are inaccurate because of a friction or lost motion in the operating mechanism. These difficulties, in addition to others, are overcome by the instrument now to be described.

For illustrative purposes, the instrument will be described as a thermometer.

Generally speaking, and with reference to the figure, the instrument comprises a pointer-operating mechanism or clock movement generally indicated at 10 which swings a large pointer 11 of a size readily visible from a distance or from a passing automobile, for example. This pointer swings over a graduated dial (not shown) to indicate a condition as interpreted by a condition-responsive device, such as a fluid filled bulb 13, for example. Movement 10 also operates a small pointer 12 located at the rear of the instrument.

Bulb 13 may be of any suitable type and is connected to a helical tube 14 by a capillary 15 housed in a preferably flexible cable 16, which also houses another capillary 17 connected to a compensating helical tube 18. The right-hand end 18a of tube 18 is anchored and its free end 18b is connected to one end of a rigid strap 19 whose other end is connected to a shaft 20. The other end of shaft 20 carries an arm 21 to which one end of a link 22 is connected. The other end of link 22 is attached to an arm 23 secured to the right-hand end 14a of tube 14, whose other end 14b is operatively connected to an arm 23a which carries one end of a link 24. Preferably capillary 15 includes a length 15a coiled about end 14a of tube 14 for a purpose described below.

As noted, bulb 13 is filled with temperature responsive fluid which expands and contracts upon rise and fall of temperature, respectively. Capillary 17 is similarly filled. Thus upon a change, an increase for example, in temperature, the fluid in bulb 13 increases the pressure within helix 14, causing the helix to move arm 23 clockwise, as shown in the drawing. This interpretive action of helix 14 and arm 23 may be inaccurate, however, if it is not corrected for expansion of the temperature of the capillary 15 and helix 14. To this end compensating tube 18 and capillary 17 are provided. Expansion of the fluid in capillary 17 or helix 18 increases the pressure in helix 18 to cause it to move counterclockwise. This movement is translated by arm 21 and link 22 to arm 23 which accordingly swings counterclockwise upon the temperature rise to modify the setting of tube 23 and correct its action to an accurate interpretation of the temperature change. Modification of the setting of helix 14 is not resisted by the attachment thereto of capillary 15 because of the coiled length 15a of the capillary.

It now appears that a temperature variation results in movement of link 24 to the right or left as the temperature rises or falls, and this movement is the true interpretation of the temperature change. The free end of link 24 is accordingly accurately positioned in accordance with the temperature as measured by the bulb.

The left-hand end of link 24 is connected to a rotary switch generally indicated at 40, the link being directly connected to an arm 25 secured to and rotatable with a pair of spaced discs 26 and 27 fastened to a shaft 28 preferably substantially frictionlessly mounted in suitable bearings (not shown). Discs 26 and 27 carry contact plates 29 and 30 each of which is mounted on an insulating sleeve (not shown) carried by shaft 28. The plates are electrically connected in any suitable manner. Plates 29 and 30 are positioned to engage respectively contact arms 31 and 32 mounted on a stud 33 between insulators 34, 35 and 36 also on the stud, the stud being secured to a bracket 37 which is pivotally mounted in suitable bearings (not shown) coaxially with shaft 28. Stud 33 also carries a pair of terminal arms 38 and 39 respectively connected electrically to contact arms 31 and 32.

Thus movement of link 24 in one direction or the other moves contact plates 29 and 30 toward or away from contact arms 31 and 32 which, in turn, are movable toward and away from the contact plates by virtue of the pivotal mounting of bracket 37.

The free end 37a of bracket 37 is connected to the lower end of a link 41 whose upper end is adjustably fastened to the free end of an arm 42 secured to and rotatable with a gear 43 rotatably mounted on the housing of pointer-operating mechanism 10. Gear 43 is driven by a train of reduction gears comprising gears 44 and 45 mounted on a shaft 46, gears 47 and 48 mounted on a shaft 49 and gear 50 mounted on a shaft 51 driven by mechanism 10. Preferably these gears are cut to afford a substantial reduction between gears 50 and 43.

Preferably mechanism 10 comprises an electric clock movement of standard construction such as might be employed for a tower clock or the like. Accordingly, movement 10 includes a shaft 52 which carries pointer 11, this shaft being that which would carry the hour hand of said clock and accordingly capable of moving one-half of an angular degree per minute. Shaft 51 is that which would carry the minute hand of a clock, and hence is capable of moving six radial degrees per minute. Movement 10 includes a reversible driving motor generally indicated at 53 which drives a shaft 54 carrying a gear 55a which meshes with a gear 55 which in turn meshes with a drive gear 56 to drive movement 10. Preferably gear 55 is mounted on a lever 57 pivoted at 58 on the casing of movement 10. Lever 57 carries the gear 55 so that clockwise movement of lever 57 unmeshes gears 54 and 56 and disconnects the drive of movement 10 to permit manual adjustment thereof by a knurled knob 60. A spring 59 biases lever 57 counterclockwise to maintain gears 54, 55 and 56 in mesh.

Reversible motor 53 includes a rotor 61 which drives shaft 54 and accordingly movement 10. Depending on the direction of rotation of motor 53, which is controlled by rotatable switch 40 in a manner to be described, pointers 11 and 12 are swung in one direction or the other, and link 41 is raised or lowered.

Referring back to rotatable switch 40, its terminals 38 and 39 are respectively connected to lines 62 and 63. Line 62 is connected through a solenoid coil 72 of a solenoid, generally indicated at 64, to a line 65 in turn connected to one end of the secondary coil 66 of a step-down transformer generally indicated at 67, the primary coil 69 of which is connected across power lines 70 and 71. The other side of secondary 66 is connected to line 63 by a line 68. Thus when contact plates 29 and 30 of switch 40 engage contact arms 31 and 32 a circuit is closed to energize coil 72 of solenoid 64, this circuit comprising plate 29, contact 31, terminal 38, line 62, solenoid coil 72, line 65, secondary coil 66, line 68, line 63, terminal 39, contact 32 and plate 30, back to plate 29. This circuit will hereinafter be designated circuit "A."

Solenoid 64 includes a movable core 73 connected to a rod 74 which carries a pair of contact bridges 75 and 76. A line 77, including a pair of spaced contacts 78 and 79 connects line 62 with a line 80 and a line 81 respectively connected to a pair of terminals 82 and 83. Terminals 82 and 83 are engaged alternately by pivoted contact arms 84 and 85 which are operated by a timing mechanism generally indicated at 86 and described in detail below. Contact arms 84 and 85 are respectively connected to line 63 by lines 86 and 87. Therefore, when bridge 75 engages contacts 78 and 79, when either of terminals 82 or 83 is engaged, line 77 and accordingly line 68 is in circuit with line 65 through solenoid 64. The circuit connecting lines 68 and 65 comprising, solenoid coil 72, line 77, contacts 78 and 79, bridge 75, lines 80 or 81, terminals 82 or 83, arms 84 or 85 and lines 86 or 87 will hereinafter be designated circuit "B," and is a holdover circuit for the solenoid. It might here be noted that both circuits "A" and "B" are control or low voltage circuits energized through secondary 66 of transformer 67.

As noted above arms 84 and 85 are operated by timing device 86 which comprises preferably a constantly running electric motor 88 which drives a shaft 89 through a train of reduction gears 90 which illustratively rotate shaft 89 at one R. P. M. A pair of spaced cams 91 and 92 are mounted on shaft 89 and their surfaces include drops 91a and 92a which coact with followers 93 and 94 on arms 84 and 85 to actuate the arms. Cams 91 and 92 are so designed and arranged that either arm 84 is engaging terminal 82 or arm 85 is engaging terminal 83 except for a short period, e. g. one second, when neither arm is engaging either terminal. Drop 92a has slight precedence over drop 91a in the direction of cam rotation; hence just after follower 93 has dropped, and thus broken contact between arm 84 and terminal 82, follower 94 is at the top of its rise just ahead of drop 91a at which time contact between arm 85 and terminal 83 is also broken. Thus, for a moment neither of terminals 82 or 83 is engaged and accordingly circuit "B" is broken.

As noted above, circuit "B" is a hold-over circuit for solenoid 64. Thus when circuit "A" has been closed by rotary switch 40 as described above, solenoid 64 is energized and bridge 75 closes circuit "B" by engaging contacts 78 and 79. The closing of circuit "B" maintains the energization of solenoid 64 until both terminals 82 and 83 are disengaged from arms 84 and 85. If circuit "A" is not energized at this time through switch 40 no current can flow through the solenoid and its core 73 falls to disengage bridge 75 from contacts 78 and 79. When this happens engagement of terminals 82 or 83 by arms 84 or 85 is ineffective to energize the solenoid.

As noted above, movement 10 includes a reversible motor 53. This motor has a forward field winding 95 and a reverse field winding 96 respectively connected to lines 97 and 98 which respectively include spaced contacts 99, 100 and 101, 102. Contacts 99 and 101 are connected by a line 103, and a line 104 connects contact 101 with power line 71. When solenoid 64 is energized as described above, bridge 76 connects contacts 95 and 100 to make a circuit hereinafter designated, circuit "C" comprising power line 71, line 104, contact 101, line 103, contact 99, bridge 76, contact 100, line 97, forward winding 95, a neutral line 105, a connecting line 106, and power line 70. When solenoid 64 is unenergized bridge 76 connects contacts 101 and 102 to make a circuit hereinafter designated circuit "D" comprising power line 71, line 104, contact 101, bridge 76, contact 102, line 98, reverse motor winding 96, line 106 and power line 70. Thus it appears that circuits "C" and "D" are power circuits under the control of control circuits "A" and "B." According to which of windings 95 and 96 is energized, movement 10 is operated in one direction or the other to swing pointers 11 and 12 clockwise or counterclockwise, and as one or the other of the windings is always energized, motor 53 is always running in one direction or the other.

In operation, and assuming a drop in temperature, the fluid in bulb 13 contracts to decrease the pressure in helix 14. This results in an interpretive counterclockwise movement of arm 23a. Accordingly, link 24 and arm 25 move to the left and rotate discs 26 and 27 to engage plates 29 and 30 with contacts 31 and 32 respectively. This completes circuit "A" and energizes solenoid 64 causing its core 73 to rise. Contacts 78 and 79 are thus connected by bridge 75 (establishing circuit "B") and contacts 99 and 100 are connected by bridge 76 (establishing circuit "C"), to energize forward winding 95 of motor 53.

If the temperature continues to drop, link 24 and accordingly plates 29 and 30 will continue to move to the left to maintain contact with contacts 31 and 32. As long as this contact is maintained, circuit "A" and solenoid 64 remain energized to maintain the energization of forward winding 95 of motor 53. During this operation, however, gears 50—43 are moving link 41 downwardly, tending to break the contact between contacts 29 and 30. Therefore, when the temperature stops falling and plates 29 and 30 reach a position which accurately indicates the temperature, the plates move no farther to the left. Contact arms 31 and 32, however, continue their counterclockwise movement with the result that contact in the rotary switch 40 is eventually broken to de-energize circuit "A" and solenoid 64. If solenoid holdover circuit "B" is energized at the instant this break occurs, through the operation of timing device 86 counterclockwise movement of contact arm 31 and 32 continues for a short period until circuit "B" is broken by the timing device. When this circuit is broken, bridge 76 falls to make circuit D and energize reverse winding 96 of motor 53. Reversal of the motor accordingly causes upward movement of link 41 and clockwise movement of contacts 31 and 32 toward the now stationary plates 29 and 30. Because of the large reduction afforded by gears 50—43, the movement of contacts 31 and 32 is relatively slow, and accordingly they do not move far from plates 29 and 30. If the temperature remains constant, there is, of course, no further movement of plates 29 and 30, and therefore contacts 31 and 32 move repeatedly (once a minute) into and out of engagement with the plates through the alternate making and breaking of motor circuits "C" and "D," by the energization and de-energization of solenoid 64 by rotary switch 40 and timing device 86. The timing of the apparatus is such, however, that this alternate forward and reverse movement of the various parts is relatively minute and has but little effect in changing the position of pointer 11. This relatively slow overshooting artificially produced prevents the switch 40 and the bridges 75 and 76 from going on and off faster than once a minute, and so prevents their excessive wear without, however, introducing objectionable inaccuracies into the instrument.

It will now appear that contact arms 31 and 32 closely follow plates 29 and 30, as these plates move to different positions in accordance with changes in temperature. If the temperature rises, plates 29 and 30 move steadily clockwise until they reach a position in accordance with the ultimate temperature value. During this movement, contacts 31 and 32 follow the plates because of the energization of reverse motor winding 96, this winding being energized by circuit "D" which is complete as long as circuit "A" is broken.

It may now be seen that circuit "A" is intermittently energized to establish circuit "B" which is periodically broken through the operation of timing device 86, and these two circuits coact to make and break motor circuits "C" and "D" alternately. Hence motor 53 is always operating in one direction or the other and accordingly switch contacts 31 and 32 are always moving either toward or away from switch plates 29 and 30; also pointers 11 and 12 are constantly moving in one direction or the other. Because of the large reduction afforded by gear train 43—50 and because of the action of movement 10, the movement of pointer 11 and switch contacts 31 and 32 is slow. This results in an accurate indication of temperature by pointer 11 as interpreted by the corrected movement of helical tube 14 in response to bulb 13.

Thus a temperature responsive element (bulb 13) controls the position of an agent (rotary switch 40) which in turn affects the operation of indicating mechanism (movement 10 and pointer 11) to effect an accurate indication of temperature values.

Accordingly I have provided a condition indicating instrument which attains the several above-noted objects in a thoroughly practical and efficient manner.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. An instrument of the character described comprising, in combination, a switch having cooperating contacts movable to engaged and disengaged positions, means responsive to temperature variations for moving some of said contacts relative to the others, means for visibly indicating temperature variations, operating means for said indicating means including a reversible electric motor, an electric circuit for said switch, a solenoid connected to said circuit, a plurality of electric circuits for said reversible motor and alternately energizable to operate said motor in opposite directions, means associated with said solenoid for completing said motor circuits alternately, means driven by said operating mechanism for moving the other of said switch contacts relative to the first-mentioned switch contacts whereby when said contacts are in their disengaged position said solenoid is de-energized to establish one of said motor circuits and whereby when said switch contacts are engaged said solenoid is energized to establish another of said motor circuits, and means for maintaining said solenoid in energized condition for a predetermined period of time regardless of the operative condition of said switch.

2. In a condition indicating instrument having a large pointer and a corresponding index adapted to be visible from a substantial distance, in combination, a reversible electric motor for operating said pointer, a switch having relatively movable contacts, condition responsive means connected to relatively move said contacts in accordance with variations in the values of the condition, means connecting said motor to said switch to relatively move said contacts in opposite sense, a control circuit controlled by said switch, a pair of power circuits for energizing said motor to run in either of its two directions, means under control of said control circuit for effecting energization of one or the other of said power circuits at all times whereby said reversible motor is constantly energized, a hold-over circuit connected to said control circuit operated by operation of said switch in one direction to maintain the condition effected by said control circuit after said switch is operated in the opposite direction, and means for periodically interrupting said hold-over circuit to limit the time it holds the condition of said control circuit following the last-mentioned operation of said switch.

3. In a large condition indicating instrument adapted to be stationed out of doors and visible from a substantial distance, in combination, a pointer for registering on the instrument dial, a reversible electric motor for operating said pointer, a switch having movable contacts some of which are operatively connected to said motor for operation thereby, condition responsive means connected to other of said contacts whereby a variation in the condition moves said last-mentioned contacts, said first-mentioned contacts moving in one direction or another in accordance with the direction of operation of said motor so that all of said contacts comprise a follow-up device, a control circuit connected to said switch and accordingly adapted to be made or broken in accordance with the position of said contacts, a pair of power circuits for energizing said motor, a holdover circuit connected to said control circuit for maintaining the condition effected thereby for a predetermined period subsequent to deenergization of said control circuit by separation of said contacts, and means under control of said control and holdover circuits for effecting energization of one or the other of said power circuits at all times whereby said electric motor is constantly energized.

WEBSTER W. FRYMOYER.